US008135333B2

(12) United States Patent
Thomas et al.

(10) Patent No.: US 8,135,333 B2
(45) Date of Patent: Mar. 13, 2012

(54) DISTRIBUTING A BROADBAND RESOURCE LOCATOR OVER A NARROWBAND AUDIO STREAM

(75) Inventors: Peter E. Thomas, Schaumburg, IL (US); Tyrone D. Bekiares, Chicago, IL (US); Gregory D. Bishop, St. Charles, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 606 days.

(21) Appl. No.: 12/342,237

(22) Filed: Dec. 23, 2008

(65) Prior Publication Data

US 2010/0159973 A1    Jun. 24, 2010

(51) Int. Cl.
H04H 20/71      (2008.01)
(52) U.S. Cl. ....... 455/3.01; 370/352; 370/392; 704/229; 704/201
(58) Field of Classification Search ................. 455/3.01; 370/352, 392; 704/229, 201, 276, 200.1, 704/E19.009
See application file for complete search history.

(56) References Cited

U.S. PATENT DOCUMENTS

| 7,221,660 | B1 | 5/2007 | Simonson | |
| 7,330,812 | B2 * | 2/2008 | Ding | 704/200.1 |
| 2001/0056479 | A1 | 12/2001 | Miyayama | |
| 2004/0006481 | A1 * | 1/2004 | Kiecza et al. | 704/276 |
| 2004/0068399 | A1 * | 4/2004 | Ding | 704/200.1 |
| 2006/0133309 | A1 | 6/2006 | Mathis | |

FOREIGN PATENT DOCUMENTS

| JP | 2002044256 A | 2/2002 |
| KR | 1020020073357 A | 9/2002 |
| KR | 1020050486030 B1 | 4/2005 |

OTHER PUBLICATIONS

PCT International Search Report Dated Jul. 19, 2010.

* cited by examiner

*Primary Examiner* — Lam T Mai
(74) *Attorney, Agent, or Firm* — Valerie M. Davis; Kenneth A. Haas

(57) ABSTRACT

A method to transmit a broadband multimedia resource locator using a narrowband communication system embeds the broadband multimedia resource locator into a narrowband audio stream and transmits the narrowband audio stream to one or more receiving communication devices over the narrowband communication system. The receiving communication device(s) subsequently extract the broadband multimedia resource locator from the narrowband audio stream and use the broadband multimedia resource locator to access a broadband communication system to retrieve multimedia content.

6 Claims, 3 Drawing Sheets

DISTRIBUTING A BROADBAND RESOURCE LOCATOR OVER A NARROWBAND AUDIO STREAM

TECHNICAL FIELD

The technical field relates generally to communication systems, and in particular, it relates to a method of distributing broadband multimedia resource locators over a narrowband audio stream to a talkgroup.

BACKGROUND

Many mechanisms for transporting data are currently used to send data of one type or another in communications systems. Data can be transferred from broadband communication device to broadband communication device and from narrowband communication device to narrowband communication device. Currently, narrowband communication devices are commonly configured for group voice communications with members of a known group, also known as a talk group, simply with the press of a button. Public safety systems enjoy the use of the talk group capability of the narrowband communication devices, and supplement this technology with broadband communication devices to have access to multimedia capability as well.

When a user of both a narrowband and broadband communication device desires to share broadband-accessible multimedia content with the members of a narrowband talk group, however, there is currently no simple way of conveying the URL (Uniform Resource Locator) or URI (Uniform Resource Identifier) or any other multimedia address (hereafter collectively referred to as a "resource locator" or a "broadband multimedia resource locator") to inform the broadband communication devices held by the narrowband talk group members where to access the multimedia content.

For example, when a child is abducted, alerts are immediately and widely distributed to public safety responders with the use of the talk group capability of the narrowband communication devices. In addition to the verbal alert message, it would also be helpful to show the public safety responders visual data, such as photographs or video, of the child and the child's abductor if possible, as well as a list of identifying characteristics. While the photographs, video, list, and/or other multimedia content can be uploaded to an internet, intranet, or extranet website, conveying the web address of the site so that others may access the site to view the multimedia content may be cumbersome. The multimedia content would be uploaded to, for example, an internet site, but the address of this internet site would need to be relayed to a large group of public safety responders for maximum benefit. The user may provide audio annotation of the multimedia content represented by the broadband multimedia resource locator. However, a mechanism to widely and simultaneously distribute and discuss a series of forensic images associated with a particular incident would be particularly useful to public safety responders.

Limited data throughput of the narrowband system, however, makes it impractical to send such multimedia content directly over a narrowband communication system. Additionally, talk group-capable narrowband digital communications systems typically do not allow data content to be addressed to the same groups of users (talk groups). Increasingly talk group-capable narrowband digital communications systems are coupled with broadband data services. In some instances, these broadband data services may be directly coupled with the narrowband services in the same end communication device (a dual-mode narrowband/broadband communication device). In other instances, the broadband data services may exist on a companion device, which is operatively coupled via a wired or wireless PAN (personal area system) to another device which hosts the narrowband services. In still other instances, a single user may simply have physical access to both a talk group-capable narrowband digital audio device and a broadband data device.

The broadband data services described above typically have no infrastructure linking to the narrowband talk group service. Additionally, some broadband data services may not include high level group addressing functions at all, but rather provide only basic point-to-point data connectivity services. There is little sense, however, in adding additional, more costly, control functionality to the broadband system simply to facilitate common groups which are already facilitated by talk group-capable narrowband communication devices. In other words, it is not practical with present art to address multimedia content to the same set of users associated to a particular narrowband audio talk group(s). Furthermore, there is no time synchronization between the two systems such that the multimedia content could be distributed in coordination with associated narrowband audio annotation if desired.

Certainly, a talk group member could verbally communicate the address or resource locator to the members of the talk group over the narrowband communication device; however, this can be time consuming, wasting precious minutes, and misspeaks or misunderstandings can cause errors in the conveyance. This can be especially aggravating when time is of the essence such as in a child abduction situation and/or in other emergency situations.

Accordingly, what is needed is a method for distributing a broadband resource locator over a narrowband audio steam.

BRIEF DESCRIPTION OF THE FIGURES

The accompanying figures, where like reference numerals refer to identical or functionally similar elements throughout the separate views, together with the detailed description below, are incorporated in and form part of the specification and serve to further illustrate various embodiments of concepts that include the claimed invention, and to explain various principles and advantages of those embodiments.

Figure 1:
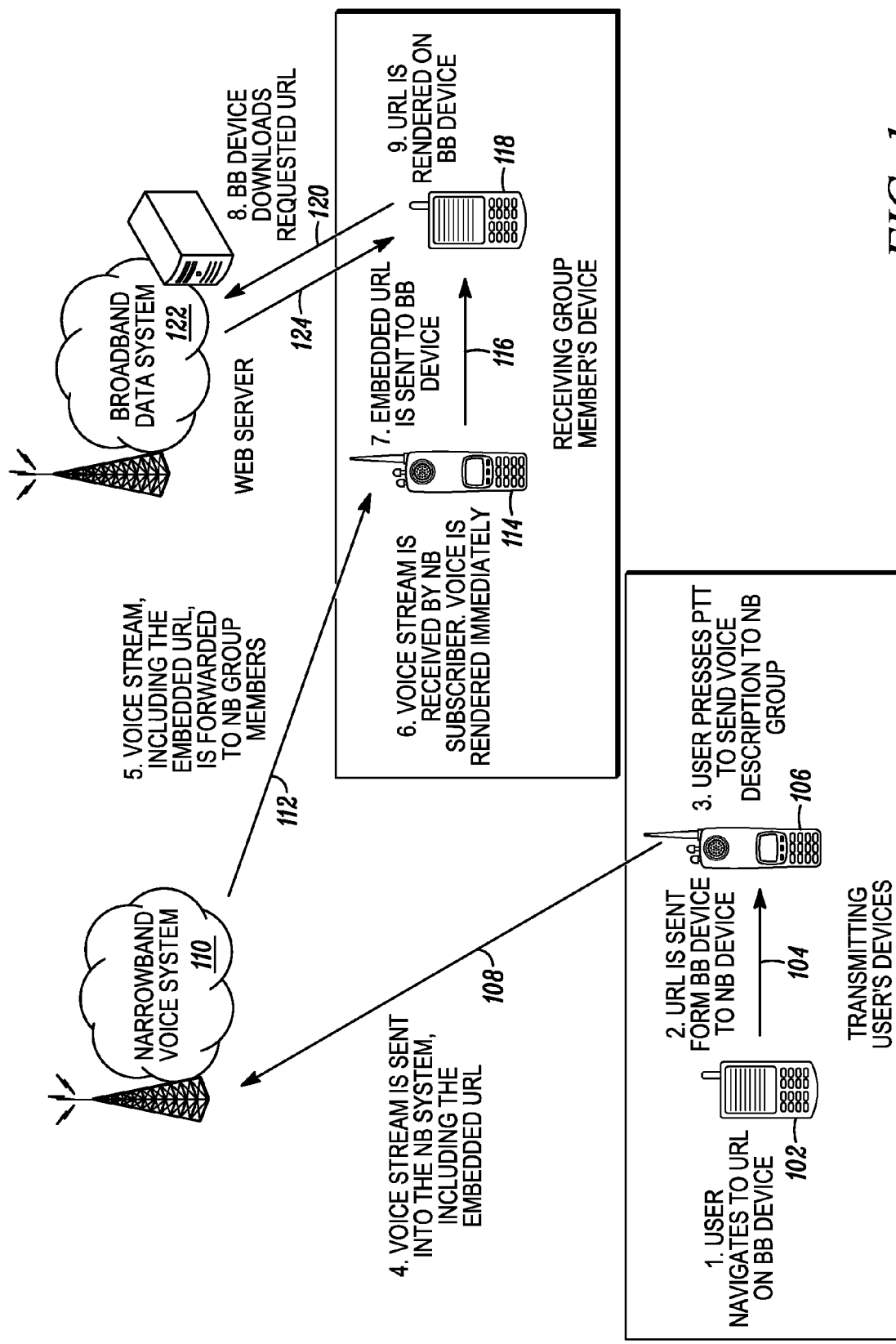
FIG. 1 is an illustrative diagram of a method and system for sharing broadband multimedia resource locator(s) with a narrowband talk group in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, and pursuant to various embodiments, the present disclosure takes advantage of the advanced group addressing capabilities already present in talk group-capable narrowband communication systems to provide group addressing for associated multimedia data available only on broadband communication systems and to be viewed independently of the narrowband communication device. A broadband multimedia resource locator is transmitted in a narrowband audio stream by embedding the broadband multimedia resource locator in a digital narrowband audio stream and transmitting the narrowband audio stream, with the embedded broadband multimedia resource locator, over a narrowband communication system to one or more communication devices. The broadband multimedia resource locator may be compressed prior to being embedded into the narrowband audio stream. Moreover, a user may manually or automatically upload a broadband multimedia resource locator referencing specific multimedia content into the talk group-capable narrowband communication device.

The infrastructure distributes the audio in a narrowband audio stream along with the embedded broadband multimedia resource locator, to a plurality of narrowband communication devices associated with one or more talk groups. The broadband multimedia resource locator is received by a narrowband communication device which is coupled to a broadband communication device or is received by a dual mode narrowband/broadband communication device having both narrowband talk group capabilities in addition to broadband data capabilities.

Upon receiving a broadband multimedia resource locator using a narrowband audio stream, the broadband multimedia resource locator is extracted from the narrowband audio stream. The broadband communication system is accessed using the broadband multimedia resource locator to retrieve multimedia content over the broadband communication system, and the multimedia content is reproduced. Those skilled in the art will realize that the above recognized advantages and other advantages described herein are merely illustrative and are not meant to be a complete rendering of all of the advantages of the various embodiments.

Turning now to the figures and in particular FIG. 1, there is shown a diagram of an embodiment illustrating the principles of the present disclosure. A user navigates to a broadband multimedia resource locator on a broadband communication device 102. The broadband multimedia resource locator for multimedia content is transferred 104 from the broadband communication device 102 to a narrowband communication device 106. In another embodiment, a user may manually or automatically upload a broadband multimedia resource locator referencing specific multimedia content into the talk group-capable narrowband communication device. The broadband multimedia resource locator is embedded in a digital narrowband audio stream and transmitted 108 in the narrowband audio stream over a narrowband communication system 110. The broadband multimedia resource locator is forwarded 112 over the narrowband communication system 110 to one or more communication devices 114; wherein in one embodiment, the infrastructure of the narrowband system distributes the narrowband audio stream with the embedded broadband multimedia resource locator to a plurality of narrowband communication devices 114 associated with the one or more talk groups. The broadband multimedia resource locator may be compressed prior to embedding into the narrowband audio stream.

The broadband multimedia resource locator is received by a narrowband communication device 114, which is coupled to a broadband communication device 118; and the broadband multimedia resource locator is transferred 116 to the broadband communication device. In another embodiment, the broadband multimedia resource locator is received by a broadband communication device 118 directly, the broadband communication device having both narrowband talk group capabilities in addition to broadband data capabilities.

Upon receiving the narrowband audio stream, the broadband multimedia resource locator is extracted from the narrowband audio stream. The broadband communication device 118 accesses 120 the broadband communication system 122 using the broadband multimedia resource locator to retrieve multimedia content over the broadband communication system 122. For example, the broadband communication device 118 downloads the requested broadband multimedia resource locator, and the multimedia content is rendered 124 on the broadband communication device 118. A narrowband communication system is defined here to be a group-enabled, digital voice-capable communication system with end-user devices that are constrained to communicating at data rates at or below 19.2 kilobits per second. A broadband communication system is defined here to be a data-capable communication system with end-user-devices that are capable of communicating at data rates above 19.2 kilobits per second.

Figure 2:
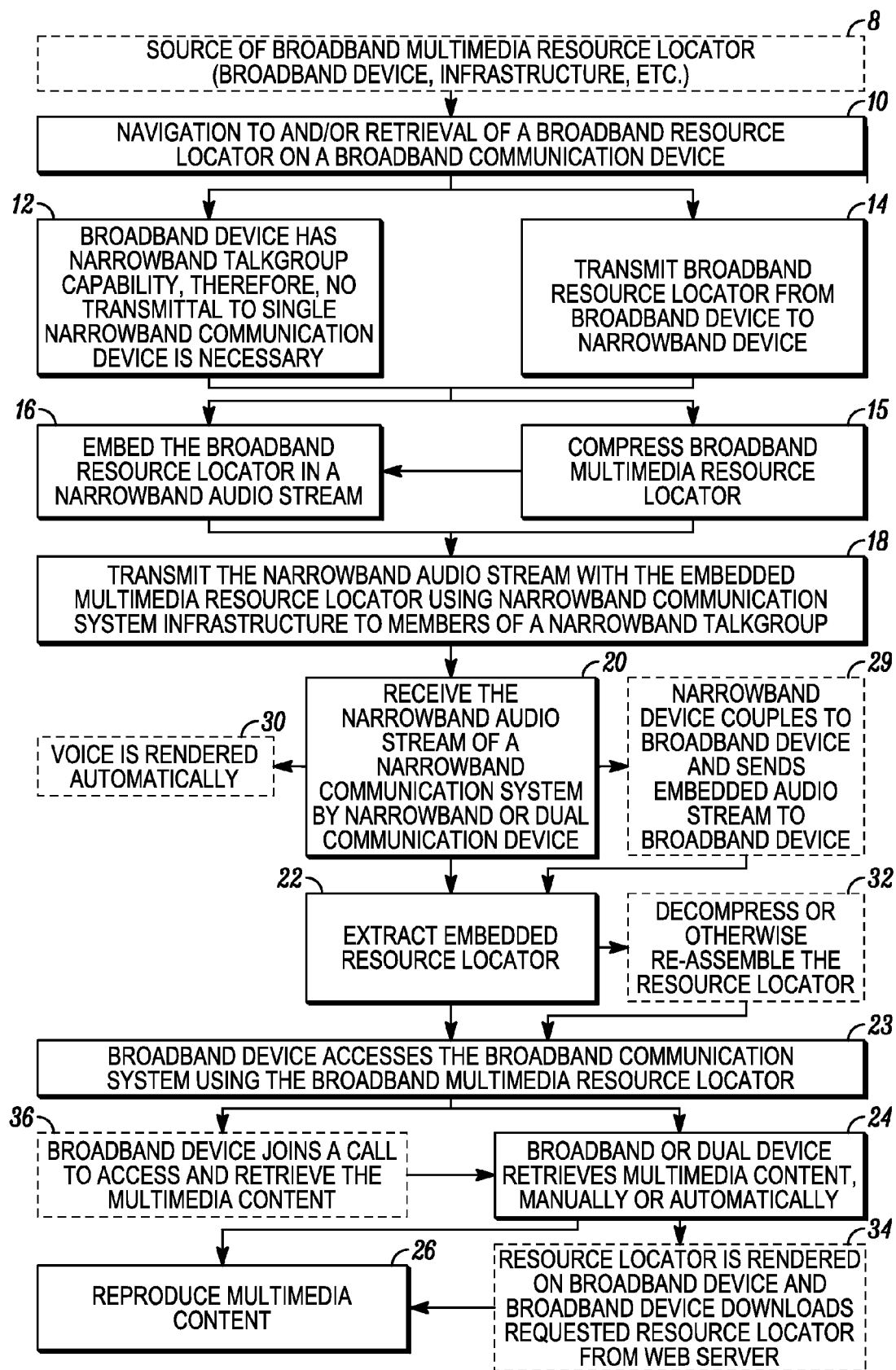
FIG. 2 is a more detailed flow diagram of the method to share broadband multimedia resource locator(s) with a narrowband talk group in accordance with some embodiments.

In FIG. 2 there is shown a flowchart in accordance with the principles of the present disclosure. A broadband multimedia resource locator is stored, acquired, or navigated to using a broadband communication device at Block 10. A broadband multimedia resource locator, such as a URL (uniform resource locator), URI (uniform resource identifier), or URN (uniform resource name), is a compact string of characters or bytes used to locate, identify, or name multimedia content or actions available on a broadband system. Example content may include audio, video, photographic, non-audio, non-visual content, or other multimedia content available on the broadband system. The multimedia content may be hosted on an internet, intranet, ftp site, or extranet website (hereafter collectively referred to as a "website"), or other digital information repository. In a present embodiment, it is assumed that the broadband multimedia resource locator in question points to multimedia content stored on a website.

The multimedia content can be sourced at Block 10, for example, by the communication device that initiated sending the broadband multimedia resource locator, by an infrastructure device accessible by the broadband communication system, or by another communication device that is not the initiator of the communication. It is understood that the source of the multimedia content can originate from any device accessible to and/or by the broadband communication system and the present examples are used for illustration purposes only and not intended to limit the source of the multimedia content. As used herein, an infrastructure device is a device that is a part of a fixed network infrastructure and can receive and/or store information (either control or media, e.g., data, voice (audio), video, etc.) from any source and transmit information in signals to one or more wireless communication devices via a communication link. The infrastructure includes, but is not limited to, equipment commonly referred to as servers, controllers, base stations, base transceiver stations, access points, routers, or any other type of infrastructure equipment interfacing a wireless communication device or subscriber unit in a wireless environment. The broadband multimedia resource locator is used to directly access the multimedia content, or may be used to join a session to retrieve the multimedia content. The present disclosure only requires that a broadband communication device have an ability to couple to a narrowband communication device and that it have an application to retrieve multimedia content specified by a broadband multimedia resource locator. In particular, however, it does not require that the broadband system provide any form of messaging service supporting individual or group addressing. The advantage of the present disclosure is that the groups only have to be defined in the narrowband system.

The broadband communication device acquiring the broadband multimedia resource locator may have dual-mode broadband and narrowband capabilities at Block 12, or the broadband communication device may be capable of receiving the narrowband media. In another embodiment, the broadband communication device may be coupled to a narrowband communication device at Block 14 and the broadband multimedia resource locator is subsequently transferred from the broadband communication device to the narrowband communication device. A narrowband communication device includes, but is not limited to, devices commonly referred to as access terminals, mobile radios, portable radios, mobile stations, wireless communications devices, user equipment, mobile devices, or any other narrowband communication device capable of operating in a wireless environment. Examples of digital narrowband communication systems include APCO P25 Phase I, APCO P25 Phase II, TETRA, iDEN, and DMR. Examples of broadband communication devices include, but are not limited to, mobile phones, cellular phones, Personal Digital Assistants (PDAs), laptops, desktops, and any other device capable of receiving or accessing multimedia content from a broadband system. Digital broadband communication systems include, but are not limited to, IEEE standards for wireless networking such as 802.11 and 802.16, and other wireless technologies such as evolution data optimized (EVDO), universal mobile telecommunications service (UMTS), high speed packet access (HSPA), and long term evolution (LTE) wireless technologies.

In a preferred embodiment, the broadband multimedia resource locator is inserted automatically into the narrowband communication device by way of an electronic transfer from a coupled broadband communication device. Coupling of the narrowband and broadband communication devices may be through either a wired or wireless PAN (personal area network). In another embodiment, the broadband multimedia resource locator may be injected into the narrowband communication device manually, by way of a user typing in the broadband multimedia resource locator, Block 14. Prior to embedding, the broadband multimedia resource locator may be digitally compressed or sectioned, at Block 15, in order to insert into the audio stream.

In either embodiment, the broadband multimedia resource locator to be transmitted is embedded in a narrowband audio stream at Block 16. The broadband multimedia resource locator may be embedded, for example, automatically when a user activates a talk group session or may be embedded manually when requested. The broadband multimedia resource locator may be embedded in a Low Speed Data Word (LSDW) within the narrowband audio stream, embedded in a plurality of stolen bits of the narrowband audio stream, or embedded in an Encryption Sync Field within a voice superframe included in the narrowband audio stream.

The narrowband audio stream, with the broadband multimedia resource locator embedded therein, is transmitted over a narrowband communication system at Block 18. Taking advantage of the talk group capabilities of the narrowband communication devices and system, the broadband multimedia resource locator is distributed to one or more talk group members substantially simultaneously. A talkgroup is a group or collection of members, subscribers, and/or subscriber units (collectively referred to herein as "members") configured for group communications over a communication system. Also, in general, communication links (also referred to herein as channels) comprise the physical and/or non-tangible communication resources (e.g., radio frequency (RF) resources) over which information is exchanged within the communication network. Communication links can be wireless or wired.

Once received by the affiliated narrowband communication devices at Block 20, any associated audio may be rendered immediately at block 30. The broadband multimedia resource locator can be transferred to a coupled broadband communication device at block 29 in either a manual or automatic fashion. Decompression, at block 32 and/or extraction, at block 22 of the broadband multimedia resource locator data bits may be performed at either the narrowband communication device or the broadband communication device. In one embodiment, the broadband communication device automatically accesses the broadband communication system using the broadband multimedia resource locator at block 23. Then the multimedia content can be retrieved at block 24 and reproduced automatically at Block 26. In another embodiment, the broadband communication device requires the user to manually begin download of the broadband content at block 24. In the present example, the term automatic indicates the action is accomplished without user interaction, while a manual input may require the user to physically enter information, for example, the URI into an application or for example, to physically approve the broadband access attempt.

In one embodiment, transfer or retrieval of the multimedia content identified by the multimedia resource locator is done automatically via a wireless Bluetooth PAN. In other automatic embodiments, the transfer may be done using any available wired or wireless PAN technology. In another embodiment, the broadband multimedia resource locator may simply be displayed on the user interface of the narrowband communication device, and manually typed into a broadband communication device. In another embodiment, the user may join a session in order to access and retrieve the multimedia content at block 36. The multimedia content can then be reproduced by the broadband communication device at block 26. In yet another embodiment, the resource locator is rendered on the broadband device, and the broadband device downloads the requested resource locator from a web server at Block 34.

Figure 3:
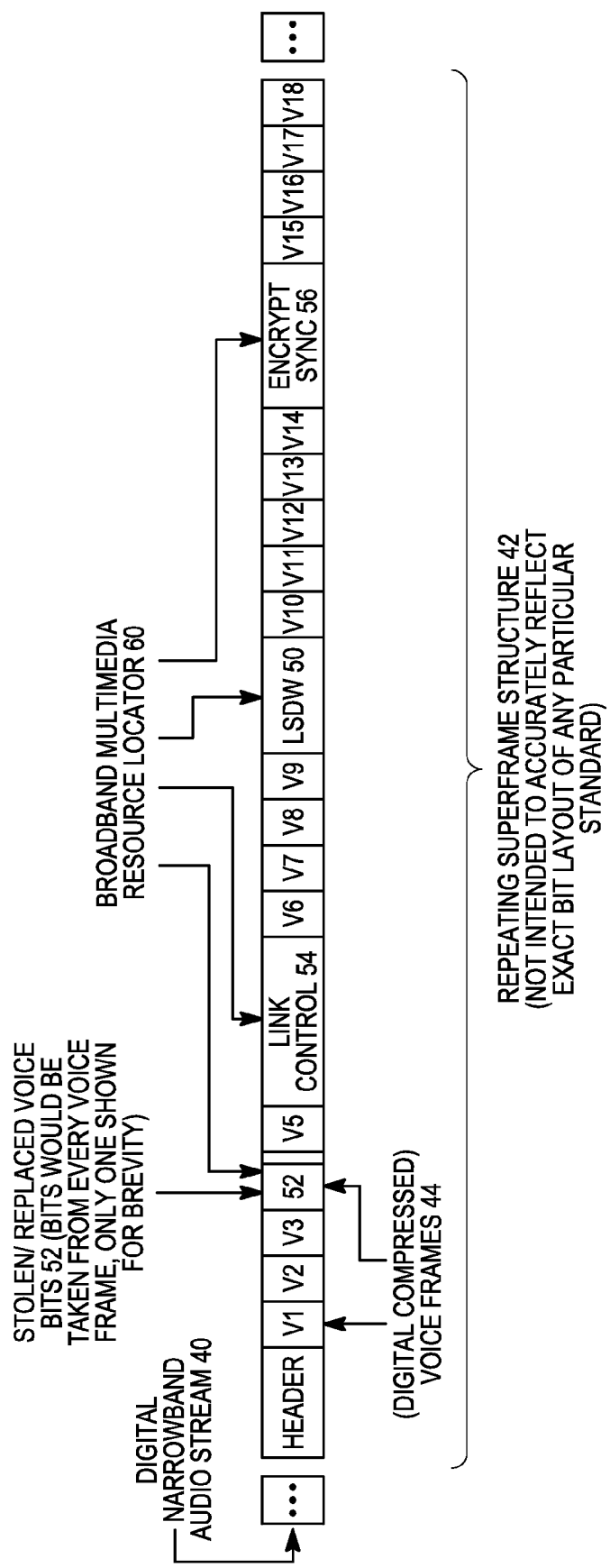
FIG. 3 is a diagram of a narrowband audio stream showing a variety of areas where or how the broadband multimedia resource locator is embedded in accordance with some embodiments.

FIG. 3 illustrates a digital narrowband audio stream 40 and the various methods of embedding a broadband multimedia resource locator 60, such as a URL, within the narrowband audio stream 40. In one embodiment, the narrowband audio stream over which the broadband multimedia resource locator is sent is a digital audio stream 40 having a repeating superframe structure 42 made of multiple digital voice frames 44. Each digital voice frame is comprised of several bits in which data is encoded. Before the broadband multimedia resource locator 60 is embedded in the narrowband audio stream 40, it may be first compressed and/or fragmented through a variety of standard and custom techniques.

The broadband multimedia resource locator 60 may be embedded in the narrowband audio stream 40 through a variety of mechanisms. In one embodiment, the talk group-capable narrowband communication system is an Association of Public Safety Communications Officials International Project25 (P25)-compliant system. If the system is P25-compliant, several embedding options exist.

In a first embodiment for P25-compliant systems, the narrowband communication device includes the compressed broadband multimedia resource locator 60 in the "Low Speed Data Word" 50 of the superframe 42. The P25 CAI (Common Air Interface) standards define the "Low Speed Data Word", or LSDW, 50, as a 32 bit field which is available at every audio superframe 42 boundary. Voice superframes appear every 360 ms, yielding an 88 bit/s embedded stream. It is contemplated that a broadband multimedia resource locator 60 could be sufficiently compressed such that the entire broadband multimedia resource locator is repeated at least once per second. In this example, the broadband multimedia resource locator 60, a URL, may be one long URL segmented into portions for easier embedding or may be three short URLs embedded in the audio stream, or may be one URL repeated several times within the audio stream. Repeating the broadband multimedia resource locator multiple times in the audio stream would provide increased error resilience, provide availability to late entry subscribers, and accommodate relatively short audio streams. This method also has the advantage of not impacting the existing audio or security services of the P25 standard in any way. Because the broadband multimedia resource locator 60 is embedded directly in the audio stream 40, it will be visible across a standard P25 ISSI (inter subsystem interface).

In another embodiment for P25-compliant systems, the narrowband communication device uses or replaces several of the least significant bits from each P25 audio frame to encode a portion of the broadband multimedia resource locator, also known as "bit stealing" 52. It is contemplated that approximately 8 bits could be taken or replaced from an audio frame 44 without significantly impacting audio quality. Because the broadband multimedia resource locator 60 is embedded directly in the audio stream 40, it will be visible across a standard P25 ISSI (inter subsystem interface) and recorded by standard digital audio communication devices.

In another embodiment for P25-compliant systems, the narrowband communication device uses the 96 bit Encryption Sync field 56 in each P25 audio superframe 42 to embed the broadband multimedia resource locator 60. Again, the broadband multimedia resource locator 60 would be visible across a standard ISSI interface. In yet another embodiment, the broadband multimedia resource locator 60 is embedded in the Link Control field 54.

Other non-P25 centric embodiments also exist and the present disclosure should not be inferred to limit the present invention to only the embodiments described. Regardless of the embedding method used, once a mode of resource locator insertion is selected, the user of the transmitting narrowband communication device activates the talk group button and provides audio for transmission in a narrowband audio stream. The broadband multimedia resource locator is embedded in the narrowband audio stream. If the audio is not long enough to facilitate transmission of the embedded broadband multimedia resource locator, or no audio exists, the sourcing communication device may artificially lengthen the audio with silence or other appropriate audio.

The supporting digital narrowband communications infrastructure then distributes the audio in a narrowband audio stream, with the broadband multimedia resource locator embedded therein over the narrowband communication system, to all other devices currently affiliated with the talk group. Because the present method uses an existing data field embedded in the transmitted narrowband audio stream, no special changes are needed to the supporting infrastructure to distribute the broadband multimedia resource locator. The receiving communication devices then extract the broadband multimedia resource locator to access and retrieve multimedia content for reproduction as described previously.

In conclusion, the present method allows a multimedia broadband communication device to use the narrowband talk group communication system as a means of transmitting a resource locator to the talk groups defined on the narrowband system and providing a reference to a multimedia link to be viewed independently of the narrowband communication device.

In the foregoing specification, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for indicating status of channels assigned to a talkgroup described herein. The non-processor circuits may include, but are not limited to, a radio receiver, a radio transmitter, signal drivers, clock circuits, power source circuits, and user input devices. As such, these functions may be interpreted as steps of a method to perform the indicating of status of channels assigned to a talkgroup described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for transmitting a broadband multimedia resource locator using a narrowband audio stream, the method comprising:
    receiving by a narrowband radio, a broadband multimedia resource locator;
    embedding by the narrowband radio, the broadband multimedia resource locator into a narrowband audio stream; and
    distributing by the narrowband radio, the narrowband audio stream with the embedded broadband multimedia resource locator to a plurality of communication devices associated with a talk group by transmitting the narrowband audio stream with the embedded broadband multimedia resource locator over a narrowband communication system to at least one communication device, wherein the broadband multimedia resource locator is used for accessing media on a broadband communication system.

2. The method of claim 1, wherein the broadband multimedia resource locator is received by a narrowband communication device from a broadband communication device coupled to the narrowband communication device.

3. The method of claim 1, further comprising:
    compressing the broadband multimedia resource locator prior to embedding the broadband multimedia resource locator into the narrowband audio stream.

4. The method of claim 1, wherein the broadband multimedia resource locator is embedded in a Low Speed Data Word (LSDW) within the narrowband audio stream.

5. The method of claim 1, wherein the broadband multimedia resource locator is embedded in the narrowband audio stream by replacing a plurality of bits of the narrowband audio stream.

6. The method of claim 1, wherein the broadband multimedia resource locator is embedded in an Encryption Sync Field within a voice superframe included in the narrowband audio stream.

* * * * *

UNITED STATES PATENT AND TRADEMARK OFFICE
CERTIFICATE OF CORRECTION

| | | |
|---|---|---|
| PATENT NO. | : 8,135,333 B2 | Page 1 of 1 |
| APPLICATION NO. | : 12/342237 | |
| DATED | : March 13, 2012 | |
| INVENTOR(S) | : Thomas et al. | |

It is certified that error appears in the above-identified patent and that said Letters Patent is hereby corrected as shown below:

In Fig. 1, Sheet 1 of 3, for Tag "104", in Line 2, delete "FORM" and insert -- FROM --, therefor.

Signed and Sealed this
Eighteenth Day of December, 2012

David J. Kappos
*Director of the United States Patent and Trademark Office*